US010635376B2

(12) United States Patent
Hashimoto

(10) Patent No.: US 10,635,376 B2
(45) Date of Patent: Apr. 28, 2020

(54) CLIENT AND PROGRAM

(71) Applicant: HONDA MOTOR CO., LTD., Tokyo (JP)

(72) Inventor: Masayuki Hashimoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 15/622,280

(22) Filed: Jun. 14, 2017

(65) Prior Publication Data

US 2017/0371613 A1 Dec. 28, 2017

(30) Foreign Application Priority Data

Jun. 23, 2016 (JP) ................................. 2016-124996

(51) Int. Cl.
  *G06F 3/14* (2006.01)
  *H04M 1/725* (2006.01)
  *G06F 3/0481* (2013.01)
  *H04W 88/02* (2009.01)

(52) U.S. Cl.
  CPC ........ *G06F 3/1454* (2013.01); *G06F 3/04817* (2013.01); *H04M 1/72519* (2013.01); *H04M 1/72522* (2013.01); *H04W 88/02* (2013.01)

(58) Field of Classification Search
  CPC ........................... G06F 3/1454; G06F 3/04817
  See application file for complete search history.

(56) References Cited

U.S. PATENT DOCUMENTS

| 10,045,190 | B2* | 8/2018 | Lee | .......................... H04W 4/80 |
| 2016/0127529 | A1* | 5/2016 | Kim | ........................ B60K 35/00 |
| | | | | 455/418 |
| 2016/0205521 | A1* | 7/2016 | Kim | ........................ B60K 35/00 |
| | | | | 701/36 |
| 2017/0195483 | A1* | 7/2017 | Gault | ................ H04M 3/42289 |
| 2017/0371613 | A1* | 12/2017 | Hashimoto | ........... G06F 3/1454 |

FOREIGN PATENT DOCUMENTS

| JP | 2011-247831 A | 12/2011 |
| JP | 2012-60396 A | 3/2012 |
| JP | 2016-24556 A | 2/2016 |

OTHER PUBLICATIONS

Volvo Web Edition Sensus Infotainment—2014.*
Japanese Office Action issued in corresponding Japanese Patent Application No. 2016-124996 dated Sep. 3, 2019.

* cited by examiner

*Primary Examiner* — David E Choi
(74) *Attorney, Agent, or Firm* — Squire Patton Boggs (US) LLP

(57) ABSTRACT

A client is provided which is connectable to multiple mobile units while reducing or eliminating inconvenience to be given to a user. A client 2 is a client 2 which is connectable to multiple mobile units 3 and 4, and includes: a client output unit 25 configured to output information; a client communication unit 23 configured to perform communication; and an output controller 211. When connection is made to one mobile unit of the mobile units 3 and 4 through the client communication unit 23, the output controller 211 outputs pieces of mobile unit identification image information P1 to P8, M1 and M2 which can identify the connected mobile unit, on the basis of communication with the connected mobile unit, to the client output unit 25.

11 Claims, 15 Drawing Sheets

CLIENT AND PROGRAM

BACKGROUND OF THE INVENTION

Field of the Invention

The present invention relates to a client and a program which communicate with a mobile unit.

Description of the Related Art

Conventionally, a system has been proposed which outputs various pieces of information according to a mobile unit through communication between a device mounted on the mobile unit and a mobile terminal carried by a user.

For example, a system has been proposed where a mobile phone receives post information, audio data and map data, from Twitter® server, voice synthesizer server, a map server and the like, and outputs the received post information, audio data and map data to a vehicle-mounted device, and the vehicle-mounted device executes various processes according to the details operated by the user (see Japanese Patent Laid-Open No. 2011-247831).

In recent years, it is not uncommon that one user uses multiple mobile units. In such a case, if the vehicle-mounted device which is a mobile unit is caused to output information as described in Japanese Patent Laid-Open No. 2011-247831, the destinations of information are different according to the mobile units, and there is a possibility that this difference makes the user inconvenient.

In view of such a problem, the present invention has an object to provide a client and a program which are connectable to multiple mobile units while reducing or eliminating the inconvenience to be given to the user.

SUMMARY OF THE INVENTION

A client of the present invention is a client connectable to a plurality of mobile units, the client comprising:

a client output unit which comprises an image display unit configured to display an image;

a client communication unit configured to perform communication; and an output controller configured to cause the image display unit to output mobile unit identification image information when connection is made to a mobile unit among the plurality of mobile units through the client communication unit, based on communication with the connected mobile unit concerned, the mobile unit identification image information being capable of identifying the mobile unit concerned.

In the present invention, the mobile unit identification image information is information which can be recognized by a person through the sense of sight among objects of perceptions used to identify the mobile unit. For example, characters, a mark or an icon which indicates the mobile unit or a combination thereof is a specific example of the mobile unit identification image information.

When the client is connected to a mobile unit among the plurality of mobile units, if the user cannot recognize whether the client is connected to the mobile unit or which mobile unit the client is connected to even in a case where the client is connected to any of the mobile units, it may make the user inconvenient.

The client having the configuration in view of this point outputs the mobile unit identification image information on the mobile unit in connection, on the image display unit, even in a case where the plurality of mobile units are connected.

Thus, the user is allowed to recognize the state of connection between the client and the mobile unit through the sense of sight of the user.

Consequently, in a case of connection between the client and any of the plurality of mobile units, inconvenience to be given to the user is eliminated or reduced.

In the client having such a configuration, it is preferable that the mobile unit identification image information contain an icon indicating the mobile unit concerned.

According to the client having such a configuration, the mobile unit identification image information containing the icon indicating the mobile unit in connection is output to the image display unit, thereby allowing the user to recognize easily the state of connection between the client and the mobile unit.

Consequently, in a case of connection between the client and any of the plurality of mobile units, inconvenience to be given to the user is eliminated or further reduced.

In the client having such a configuration, it is preferable that the output controller output the mobile unit identification image information at a position of the image display unit common to the plurality of mobile units.

According to the client having such a configuration, even in a case of connection to any mobile unit, the mobile unit identification image information is displayed at the position common to the plurality of mobile units. As a result, the user is allowed to recognize easily the state of connection between the client and the mobile unit.

In such a client, it is preferable that the mobile unit identification image information be mobile unit identification image information corresponding to a type of the mobile unit concerned.

It is assumed that even when one user use a plurality of mobile units, the types of the mobile units will be different from each other in many cases. The client having such a configuration in view of this point displays the mobile unit identification image information corresponding to the type of the mobile unit in connection, on the image display unit. As a result, the user is allowed to recognize easily the state of connection between the client and the mobile unit.

In such a client, it is preferable that even when a plurality of screens are switched, the output controller output both the switched screen and the mobile unit identification image information in a viewable manner.

According to the client having such a configuration, even when screens are switched, both the switched screen and the mobile unit identification image information are output in a viewable manner. As a result, even when the screen is switched, the user is allowed to recognize easily the state of connection between the client and the mobile unit.

In such a client, it is preferable that the output controller output a screen corresponding to the mobile unit concerned, as the mobile unit identification image information, on the image display unit.

According to the client having such a configuration, a screen corresponding to the mobile unit in connection is displayed, thereby allowing the user to recognize easily the state of connection between the user and the mobile unit.

In such a client, it is preferable that the output controller displays a screen displaying the position of the mobile unit, as the mobile unit identification image information, on the image display unit.

According to the client having such a configuration, the user can recognize the mobile unit in connection, and confirm the position of the mobile unit.

In the client of the present invention, it is preferable that the output controller output content associated with a type of the mobile unit concerned, an interface for using a function of the client associated with the type of the mobile unit concerned, or an interface for using a function of the mobile unit, as the mobile unit identification image information, to the output unit.

According to the client having such a configuration, the output content or the interface can allow the user to recognize easily the mobile unit to which the client is connected, and improve the usefulness.

In the client having such a configuration, it is preferable that when the mobile unit concerned is a mobile unit capable of transporting the user along with movement of the mobile unit, the output controller output an interface of outputting an audio, a still image or a moving image, as the interface, to the client output unit.

According to the client having such a configuration, when the mobile unit which can transport the user is connected to the client, an interface of outputting an audio, a still image or a moving image is output to the output unit. Thus, the user is allowed to recognize the mobile unit in connection, and when the connection between the client and the mobile unit is continued even during transportation by the mobile unit, the user is allowed to enjoy the audio, still image or moving image.

The client of the present invention may further include a client input unit configured to detect an operation of a user of the client, wherein the output controller is configured to output to the client output unit at least one screen among a plurality of screens according to the operation of the user detected by the client input unit.

A program of the present invention causes a client which comprises a client output unit including an image display unit configured to display an image, and a client communication unit configured to perform communication, and is connectable to a plurality of mobile units, to function as an output controller configured to cause the image display unit to output mobile unit identification image information when connection is made to a mobile unit among the plurality of mobile units through the client communication unit, based on communication with the connected mobile unit concerned, the mobile unit identification image information being capable of identifying the mobile unit concerned.

DETAILED DESCRIPTION OF THE PREFERRED EMBODIMENTS (Configuration of Server and Client System)

Figure 1:
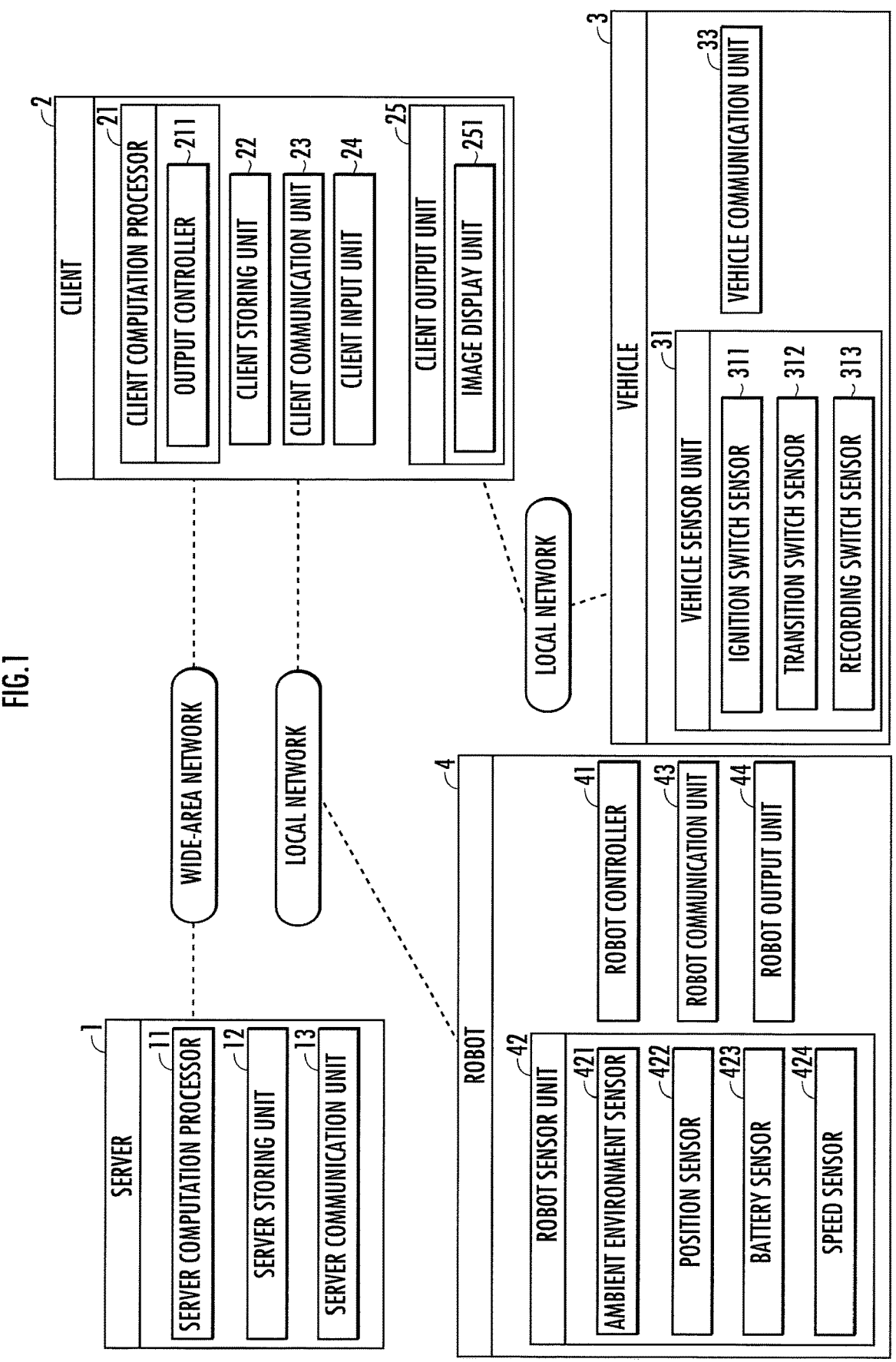
FIG. 1 is an overall configuration diagram of an information output system.

A content output system which is an embodiment of the present invention shown in FIG. 1 includes: a server 1; and multiple clients 2 which serve as mobile stations. The server 1 and the each of the clients 2 can communicate with each other via one or more networks. The client 2 includes an information terminal carried by a user. The client 2 may be temporarily or permanently mounted on a mobile unit which is an apparatus having a function of being moved according to a drive operation by a user, and is a vehicle, such as a four-wheel automobile, a two-wheel automobile or a bicycle.

(Configuration of Server)

The server 1 is a server which provides an SNS (Social Networking Service), and is made up of a computer serving as a fixed station. The server 1 includes a server computation processor 11, a server storing unit 12, and a server communication unit 13. The server 1 may be made up of a mobile-type terminal, such as a smartphone or a tablet, serving as a mobile station.

The server computation processor 11 includes: a central processing unit (CPU) which reads software and data from a designated area of a memory constituting the server storing unit 12, as required, and executes a designated computation process for the data as a target according to the software; and a communication device, storing device (memory) and the like as required.

The server storing unit 12 stores and holds traffic information and server map information. The "traffic information" contains movement cost for each link. The "server map information" contains the position, shape, orientation and the like of each link which constitutes a road, in a set of coordinate values ((latitude and longitude) or (latitude, longitude and altitude)), and further contains link identification information for identifying each link, and data representing the attribute. The links are connected to each other at nodes.

The server storing unit 12 is configured to store post information received from the client 2 of each member, the post date and time, the title of the post information, the post destination of the post information, the location information associated with the post information, and an evaluation by another person for the post information (e.g., the number of "likes").

The server communication unit 13 is connected to a public communication network, which serves as the network, and includes a communication device which communicates with an external terminal, such as the client 2.

(Configuration of Client)

The client 2 is made up of a mobile type terminal device, such as a smartphone or a tablet, serving as a mobile station. For example, the "mobile type" means that the size is equivalent to the size of a standard palm of a person, and the weight is equivalent to a weight allowing the device to be carried easily by one hand or in a pocket of clothes. The client 2 may be made up of a device larger and heavier than a mobile-type device (e.g., a device attached to a mobile unit).

In the following description, a person who uses the client 2 to be described is called a "user", and a person who uses the SNS including the user is called a "member".

The client 2 includes a client computation processor 21, a client storing unit 22, a client communication unit 23, a client input unit 24, and a client output unit 25.

The client computation processor 21 is made up of a processor, such as a CPU (central processing unit), and reads and executes a predetermined program (an SNS application) from a memory or the like, thereby functioning as an output controller 211, described later.

The client computation processor 21 is configured to measure or detect the current position of the client 2 in a time series manner. The current position of the client 2 is measured on the basis not only of a signal received by a GPS receiver from an artificial satellite but also of an output signal of a gyro sensor as required. The client computation processor 21 is configured to transmit, to the server 1, "probe information" which represents the time-series variational mode of the position of the client 2.

The client computation processor 21 is configured to transmit "route search request" to the server 1 and receive, from the server 1, "server route information" in response to the request. The client computation processor 21 is configured to retrieve a client route on the basis of the server route information using client map information and output the retrieved route to the client output unit 25.

The client storing unit 22 is configured to store and hold receipt information and a computation process result, such as a calculated result, by the client computation processor 21. The client storing unit 22 is configured to store the client map information, content and the like. The "client map information" contains, a set of coordinates which represents the positions, shapes, orientations and the like of links constituting roads, and link identification information for identifying each of the link.

The client map information does not necessarily contain the set of coordinates, but may contain image information for allowing the client output unit 25 to display a map, and the link identification information on the links constituting roads contained in the map. In this case, the server 1 may identify coordinate values coinciding with coordinate values contained in the probe information or request information among coordinate values contained in server map information to thereby identify the link identification information or road type which correspond to the identified coordinate values.

Even if the client map information and the server map information have different definitions and the like of sets of coordinates because of their different specifications and data structures, matching of links can be performed because the same link is assigned the common link identification information. The server route information containing the link identification information is transmitted by the server 1. A navigation route image including multiple links identified by the link identification information contained in the route information is displayed by the client 2 through the client output unit 25.

The client storing unit 22 may store the post information and the like which are on each member and have been periodically downloaded from the server 1.

The client communication unit 23 includes a communication device which is connected to a public communication network, serving as a wide-area network, and is connected to a communication device communicating with an external terminal, such as the server 1, and to a local network, and communicates with a vehicle 3.

The client input unit 24 is made up of operation buttons and a microphone, and allows various operations and input setting through an operation or utterance by the user. The client output unit 25 is made up of an image display unit 251 and an audio output device (loudspeaker), and displays image content, such as client map information, or outputs audio content. The client input unit 24 and the client output unit 25 may be made up of a touch panel-type display.

"Output" of information by a configuration element of the present invention means output of information in every possible form, such as display, audio output, and vibration output of the information, which can be recognized by a person through the five senses including the sense of sight, sense of hearing, and sense of touch. The configuration elements of the present invention are "configured" to execute a computation process of which the element takes charge; this means that the configuration element has a function of reading a required program and data from the memory and then executing the corresponding computation process on the basis of the data according to the program, or is programmed as such.

(Configuration of Mobile Unit)

The vehicle 3 is a four-wheel automobile, a small electric automobile, a motorcycle, an electric wheelchair, an electric unicycle or the like which is configured so that the user of the client 2 carrying this client 2 can be transported. The vehicle 3 includes a vehicle sensor unit 31, and a vehicle communication unit 33.

The vehicle sensor unit 31 includes: an ignition switch sensor 311 which outputs a signal indicating turning on and off of the ignition switch of the vehicle 3; and a transition switch sensor 312 and a recording switch sensor 313 which are included in the steering wheel of the vehicle 3. In addition to or instead of this, a position sensor, such as a GPS (Global Positioning System), a speed sensor, a gyro sensor and the like may be included in the vehicle sensor unit 31.

The vehicle communication unit 33 is connected to an inner-vehicle network, and is made up of a communication device which communicates with the client 2. The vehicle communication unit 33 is configured to transmit an output signal from the vehicle sensor unit 31 to the client 2.

(Configuration of Robot)

A robot 4 is a mobile unit which cannot transport the user of the client 2, for example, a two-legged robot. The robot 4 includes a robot controller 41, a robot sensor unit 42, a robot communication unit 43, and a robot output unit 44.

The robot controller 41 is configured to be capable of controlling the operations of hands and legs of the robot 4 and various devices.

The robot sensor unit 42 includes an ambient environment sensor 421, a position sensor 422, a battery sensor 423, and a speed sensor 424.

The ambient environment sensor 421 includes, for example, a camera and a microphone, and outputs a signal indicating the state of the ambient environment (e.g., the front) of the robot 4 (e.g., an image signal and an audio signal).

The position sensor 422 includes, for example, a GPS (Global Positioning System) receiver, and outputs a signal indicating the position of the robot 4.

The battery sensor 423 outputs a signal indicating the remaining quantity of a battery of the robot 4.

The speed sensor 424 outputs a signal indicating the movement speed of the robot 4.

The robot communication unit 43 is connected to a local network, and is made up of a communication device which communicates with the client 2. The robot communication unit 43 is configured to transmit an output signal from the robot sensor unit 42 to the client 2.

The robot output unit 44 includes, for example, an image display device and a loudspeaker.

(SNS Display Process)

Next, referring to FIGS. 2 to 8, an SNS display process executed by the client 2 is described.

Figure 2:
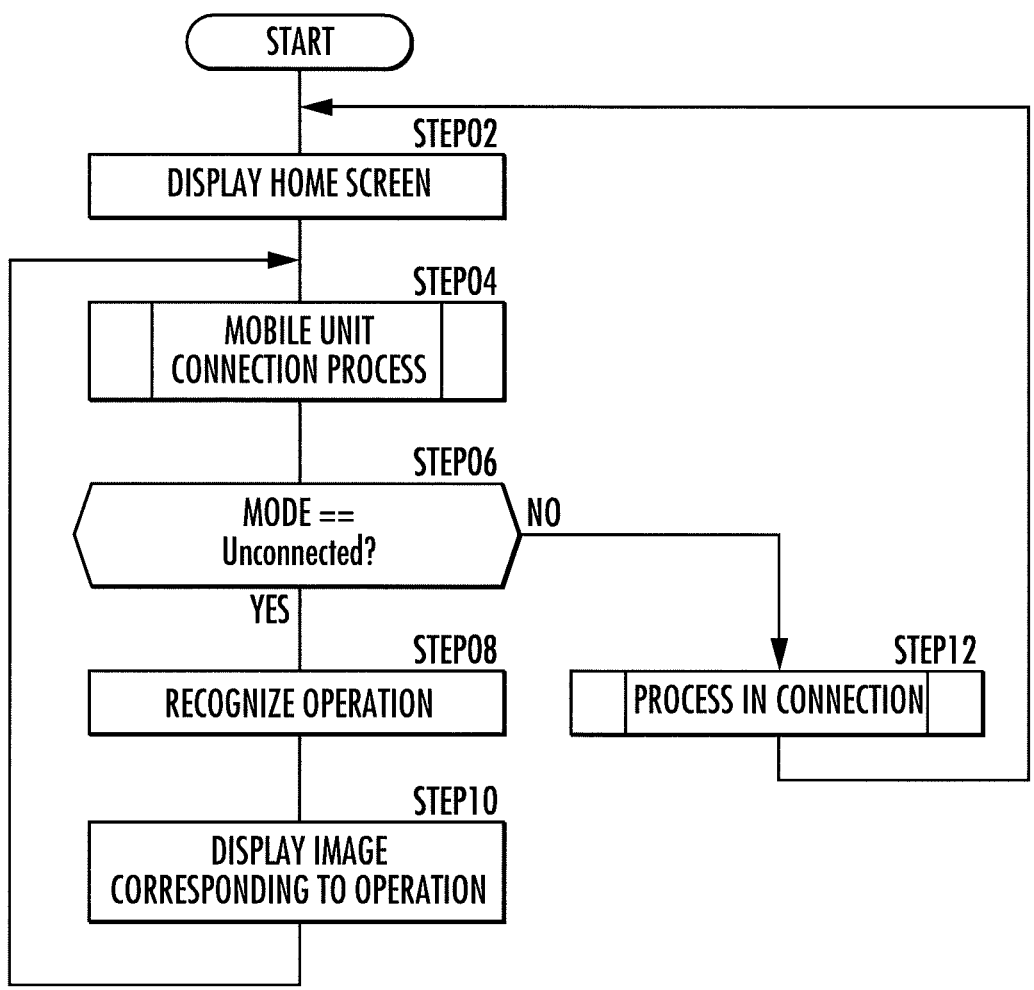
FIG. 2 is a flowchart of an SNS display process.
Figure 3:
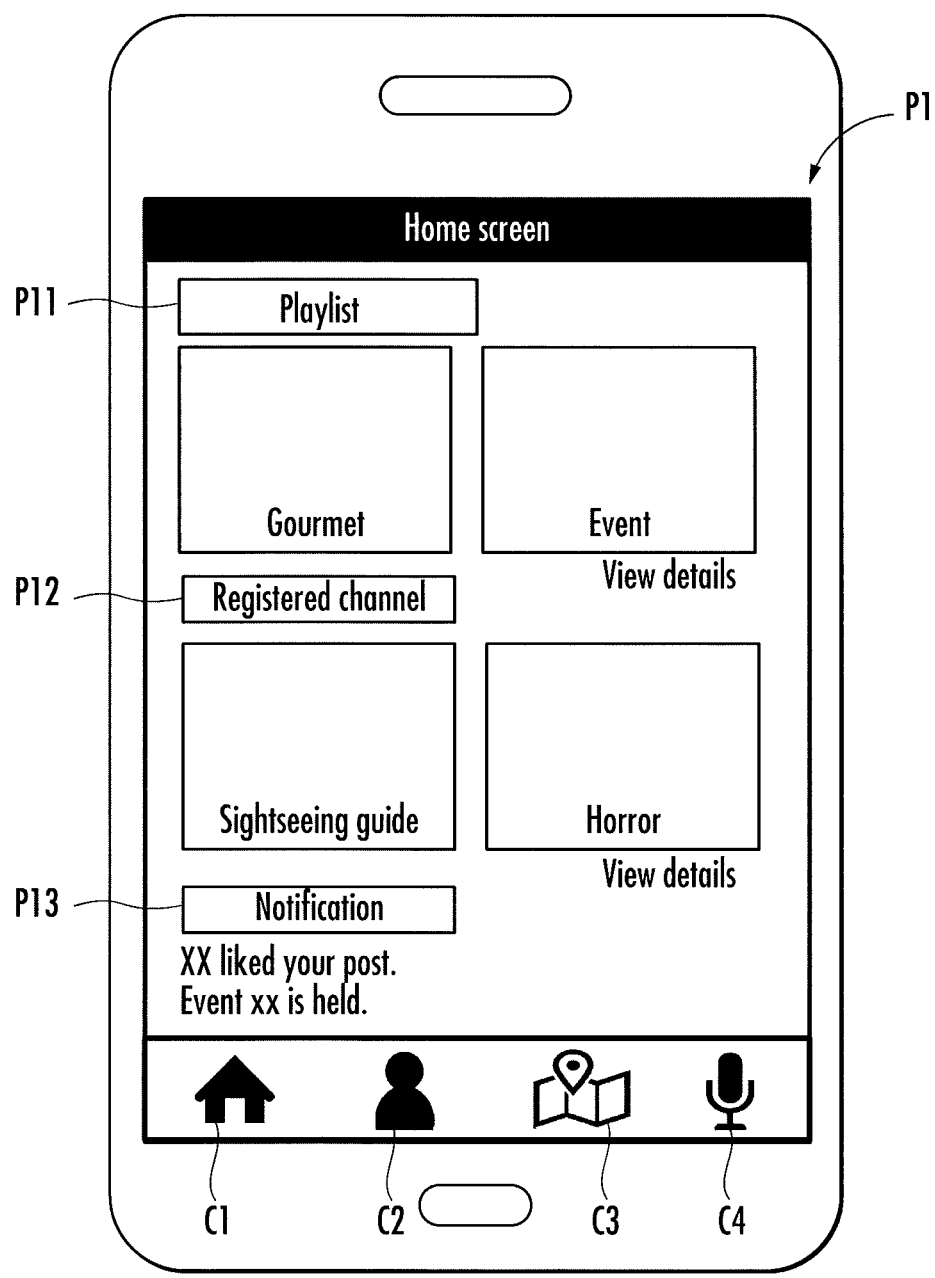
FIG. 3 is a diagram showing a configuration of a home screen.

When the SNS application installed in the client 2 is executed, the output controller 211 outputs a home screen P1 shown in FIG. 3 to the client output unit 25 (FIG. 2/STEP02).

The home screen P1 contains a playlist display P11, a registered channel display P12, and a notification display P13. The home screen P1 contains a home button C1, a my page button C2, a map button C3, and a recording button C4, at the lower positions of the home screen P1.

The playlist display P11 is a display of a list of pieces of content of general themes, such as gourmet or events.

The registered channel display P12 is a display of a list of pieces of content registered by the user of the client 2.

The notification display P13 is a display containing notification about the latest action by another member for a post by the user, i.e., "XX liked your post", or notification about the latest event, i.e., "Event xx is held".

The home button C1 is a button for transition to the home screen P1 (FIG. 3). When the home button C1 is pressed on the home screen P1, an updated home screen P1 is displayed.

Figure 4:
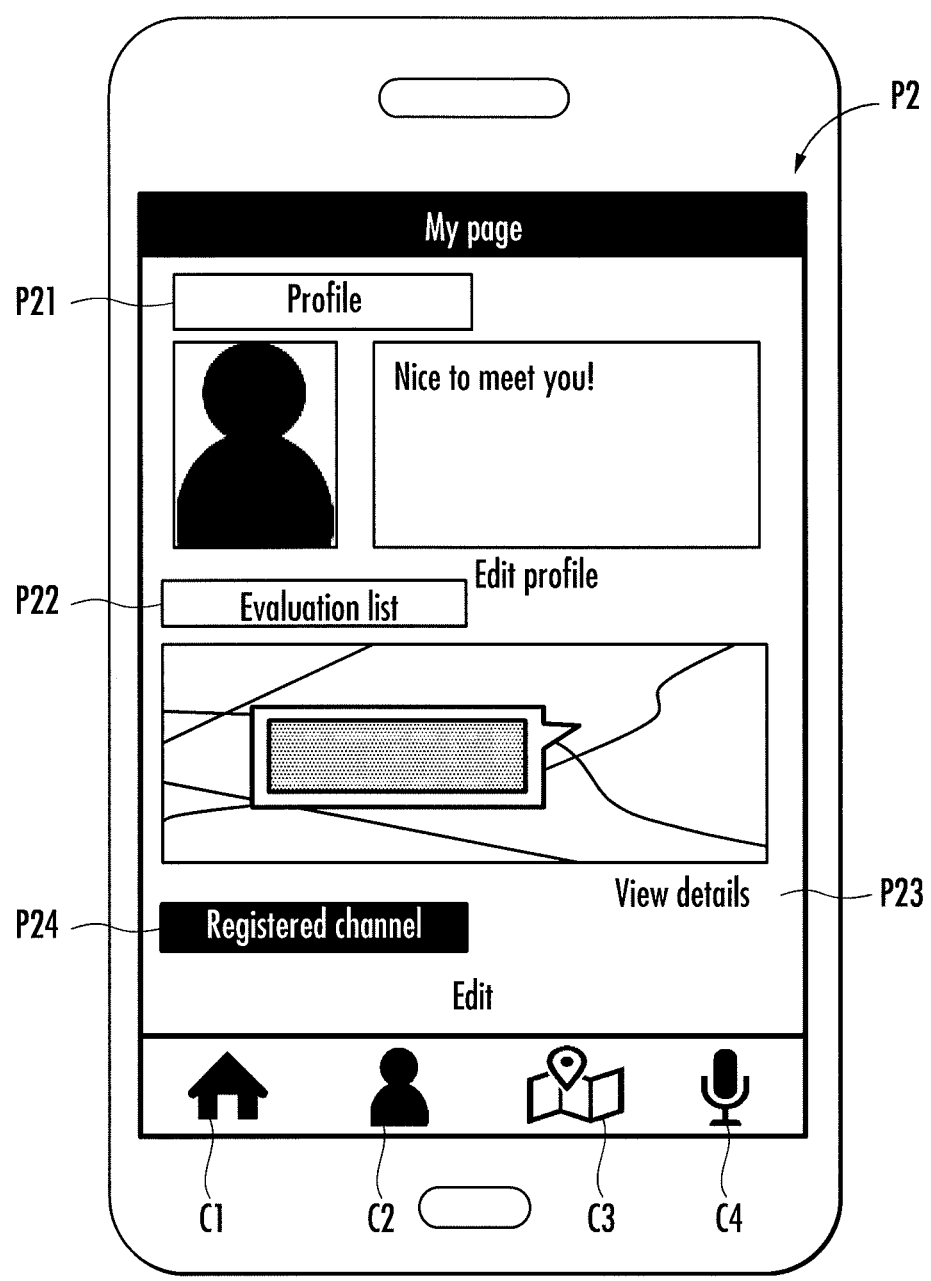
FIG. 4 is a diagram showing a configuration of a my page screen.

The my page button C2 is a button for transition to the my page screen P2 (FIG. 4).

Figure 6:
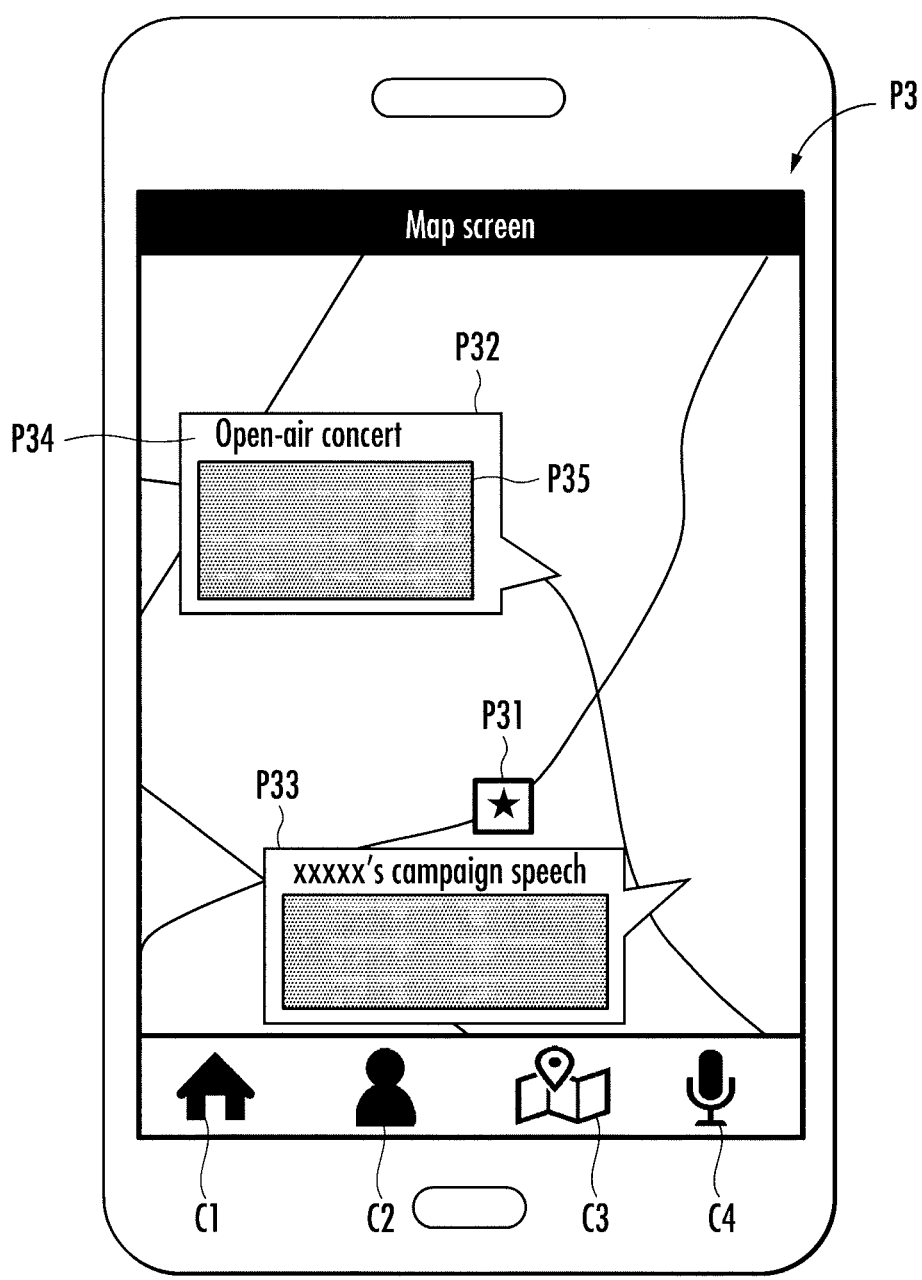
FIG. 6 is a diagram showing a configuration of a map screen.

The map button C3 is a button for transition to the map screen P3 (FIG. 6).

Figure 7:
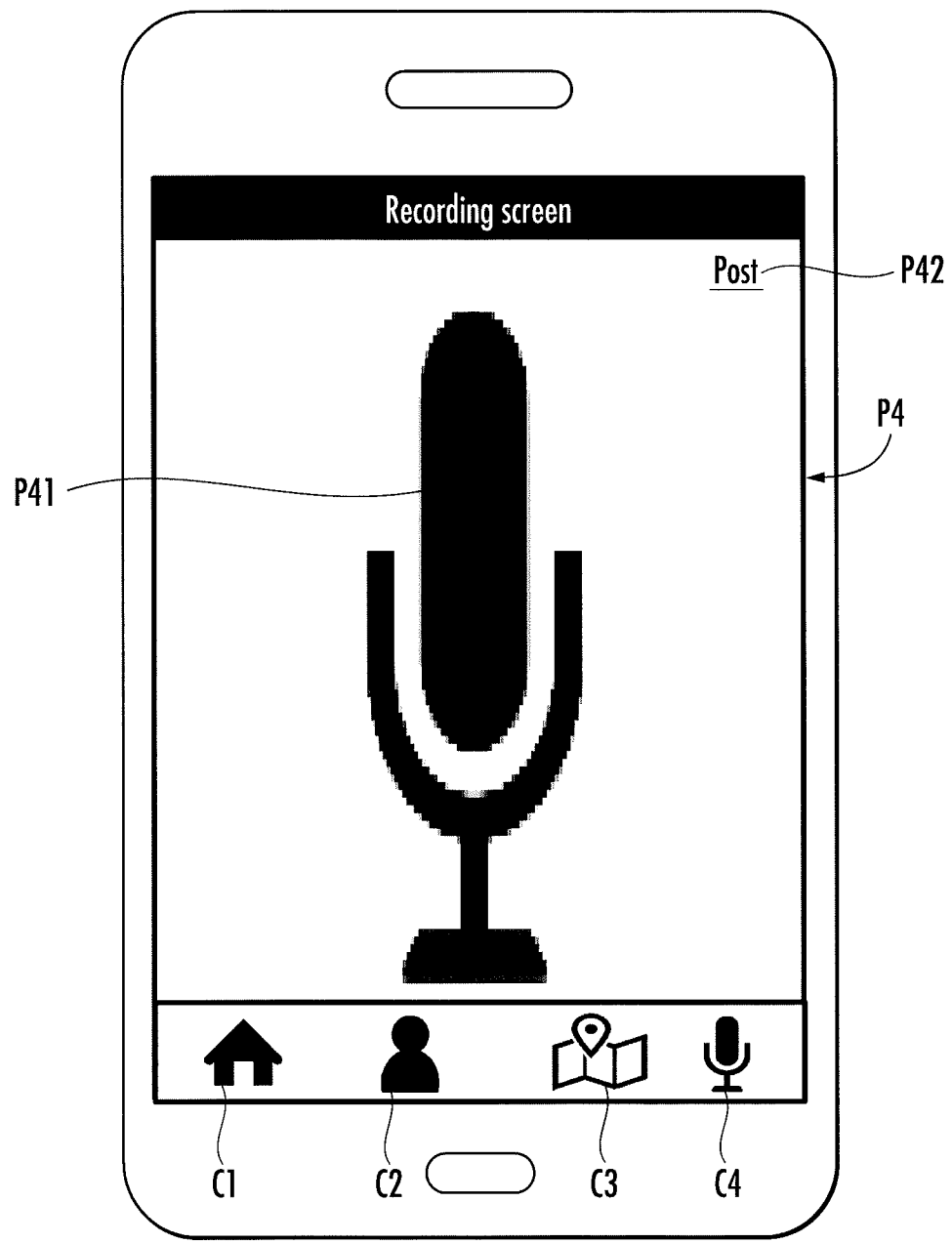
FIG. 7 is a diagram showing a configuration of a recording screen.

The recording button C4 is a button for transition to the recording screen P4 (FIG. 7).

The my page screen P2 contains a profile display P21, an evaluation list display P22, and a registered channel display P24. As with the home screen P1, the my page screen P2 contains a home button C1, a my page button C2, a map button C3, and a recording button C4, at the lower positions of this screen P2.

The profile display P21 is a display which contains an icon of the user of the client 2, or a user profile, such as a greeting message.

The evaluation list display P22 is a display which contains post information having been posted by the user of the client 2, and an evaluation by another member for the post information in an overlapping manner on the map. The evaluation list display P22 contains an evaluation confirmation screen link P23. The evaluation confirmation screen link P23 is a link for transition to an evaluation confirmation screen P25 (FIG. 5).

The registered channel display P24 is a display for editing registered channels to be displayed on the home screen.

Figure 5:
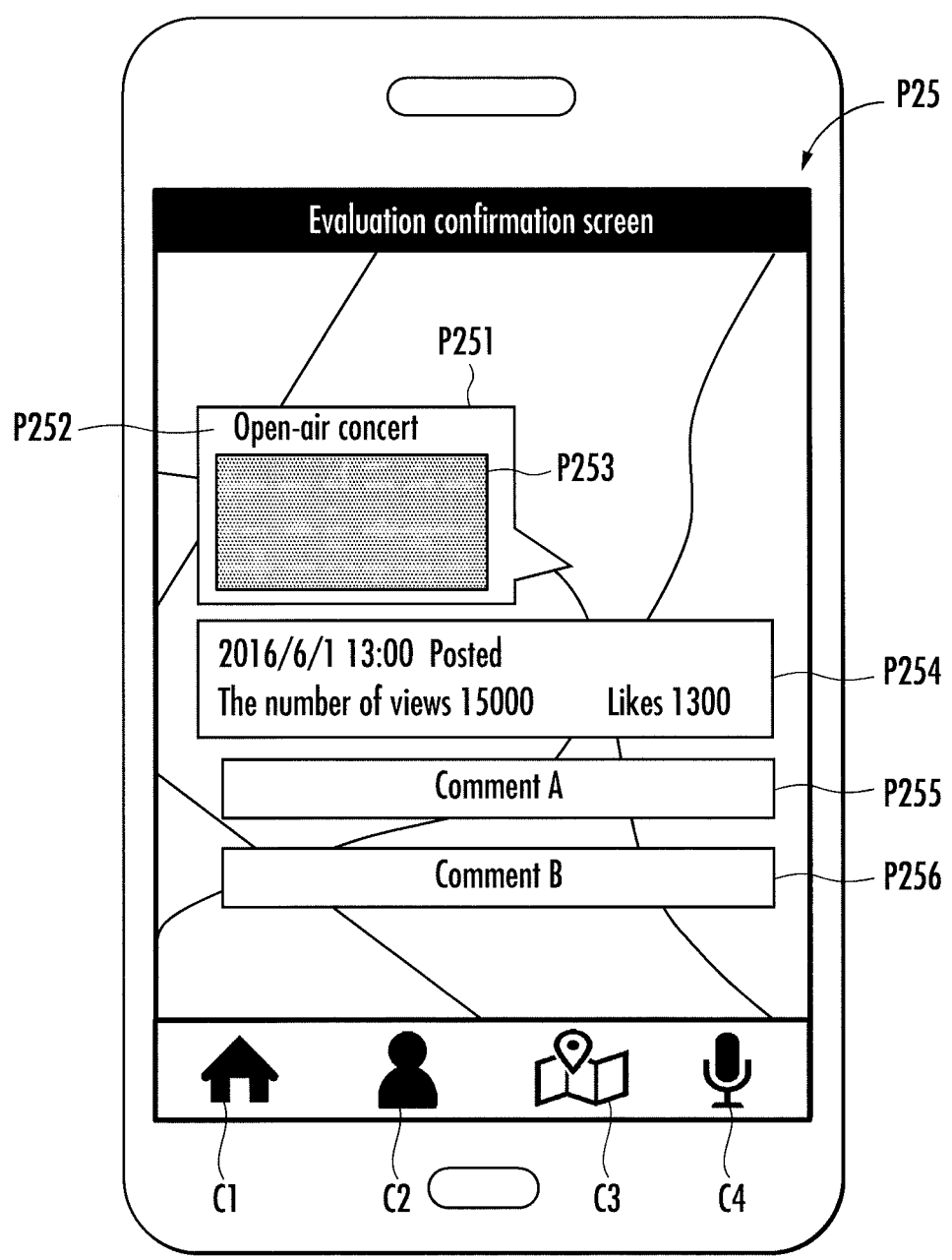
FIG. 5 is a diagram showing a configuration of an evaluation confirmation screen.

As shown in FIG. 5, the evaluation confirmation screen P25 contains a post information display P251, a post information evaluation display P254, and comment displays P255 and P256. As with the home screen P1, the evaluation confirmation screen P25 contains a home button C1, a my page button C2, a map button C3, and a recording button C4, at the lower positions of this screen P25.

The post information display P251 is a display of post information posted by the user, and contains a title display P252, and a post image display P253. Instead of or in addition to this, a text display, an audio reproduction button, a moving image reproduction button and the like may be contained in the post information display P251.

The post information evaluation display P254 is an evaluation by another member for the post information, and contains the post date and time, the number of views, and the number of people having issued an affirmative evaluation (evaluation of like). The evaluation is not limited to the affirmative evaluation. Alternatively, the evaluation may be evaluations with reference to various evaluation standards, such as "great" and "astonishing", or multi-staged evaluations (e.g., five stages).

The comment displays P255 and P256 are displays of comments by other members for the post information.

As shown in FIG. 6, the map screen P3 contains a user position display P31, and pieces of post information P32 and P33, on the map. As with the home screen P1, the map screen P3 contains a home button C1, a my page button C2, a map button C3, and a recording button C4, at the lower positions of this screen P3.

The user position display P31 is, for example, an icon displayed, in an overlapping manner, at a position on a map corresponding to the current position of the client 2 received by the GPS receiver.

The pieces of post information P32 and P33 are pieces of post information which are overlapped on the map and have been posted by the user or another member.

Each of the pieces of post information P32 and P33 contains a title display P34 and an image display P35.

As shown in FIG. 7, the recording screen P4 contains a display P41 of recording in progress, and a link P42 to a post confirmation screen P43 (see FIG. 8) for adding additional information to recorded audio. As with the home screen P1, the recording screen P4 contains a home button C1, a my page button C2, a map button C3, and a recording button C4, at the lower positions of this screen P4.

Figure 8:
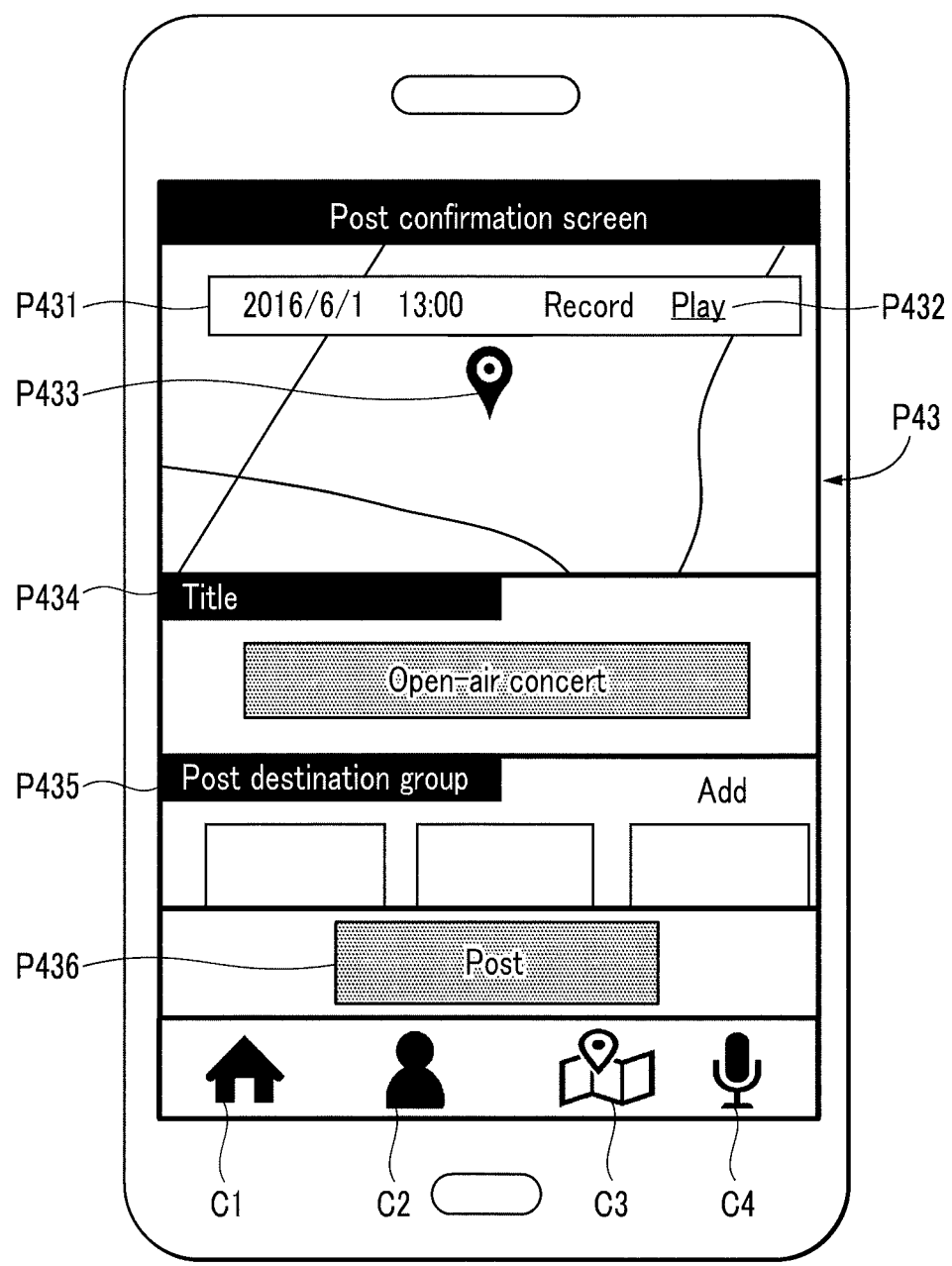
FIG. 8 is a diagram showing a configuration of a post confirmation screen.

As shown in FIG. 8, the post confirmation screen P43 contains a post date and time display P431, a posting position display P433, a title editing field P434, a post destination group selecting field P435, and a posting button P436. As with the home screen P1, the post confirmation screen P43 contains a home button C1, a my page button C2, a map button C3, and a recording button C4, at the lower positions of this screen P43.

The post date and time display P431 is a display of the date and time of creation of the post information, for example, a display of audio recording date and time. The post date and time display P431 contains a reproduction link P432 for reproducing the recorded audio and the like.

The posting position display P433 is a display of the position of the vehicle 3 (or client 2) at the time of audio recording in an overlapping manner on the map.

The title editing field P434 is a display for editing a title, which is additional information on the post information.

The post destination group selecting field P435 is a display for selecting a party with whom the post information as the additional information on the post information is shared.

The output controller 211 executes a mobile unit connection process, described later (FIG. 2/STEP04). According to this process, a mobile unit residing therearound (the vehicle 3 or the robot 4 in this embodiment) is connected via the client communication unit 23, and a value according to the connected mobile unit is stored in a variable MODE. When connection is made to the vehicle 3, "Vehicle" is stored in the variable MODE. When connection is made to the robot 4, "Non-Vehicle" is stored in the variable MODE. When connection is not made to any mobile unit, "Unconnected" is stored in the variable MODE.

The output controller 211 determines whether or not the value of the variable MODE is "Unconnected" (not connected) (FIG. 2/STEP06). The processes of FIG. 2/STEP04 and FIG. 2/STEP06 may be executed in a state where the SNS application has not been activated by the user.

When the determination result is affirmative (FIG. 2/STEP06: YES), the output controller 211 recognizes the operation by the user through the client input unit 24 (FIG. 2/STEP08).

The output controller 211 displays a screen according to the operation by the user recognized in FIG. 2/STEP08 (FIG. 2/STEP10).

For example, when the operation by the user is a touch operation for gourmet content contained in the playlist display P11 on the home screen P1, the output controller 211 outputs gourmet-related content (a gourmet description image, audio, moving image or the like) to the client output unit 25.

When the operation by the user is an operation of pressing any of the buttons C1 to C4, the output controller 211 outputs a screen corresponding to this button to the client output unit 25.

After the process of FIG. 2/STEP10, the output controller 211 executes processes in and after FIG. 2/STEP04.

When the determination result in FIG. 2/STEPO6 is negative (FIG. 2/STEP06: NO), the client computation processor 21 executes a process in connection, described later (FIG. 2/STEP12).

(Mobile Unit Connection Process)

Figure 9:
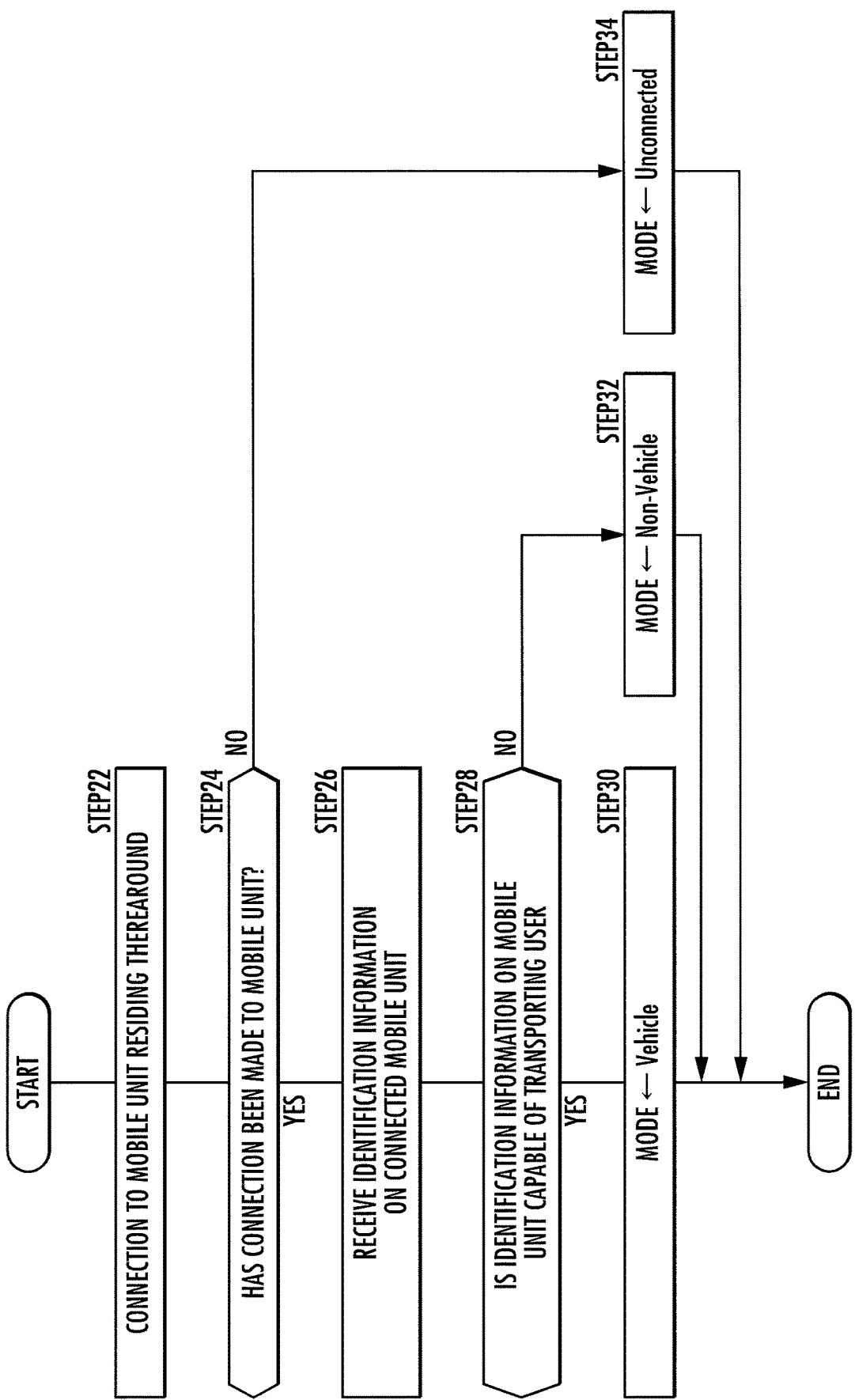
FIG. 9 is a flowchart of a mobile unit connection process.

Next, referring to FIG. 9, the mobile unit connection process in FIG. 2/STEP04 is described.

The output controller 211 is connected to a mobile unit residing therearound, through the client communication unit 23 (FIG. 9/STEP22). An example of the mobile units residing therearound is the vehicle 3 or the robot 4 shown in FIG. 1.

The output controller 211 determines whether connection has been made to the mobile unit or not (FIG. 9/STEP24).

When the determination result is affirmative (FIG. 9/STEP24: YES), the output controller 211 receives identification information on the connected mobile unit, through the client communication unit 23 (FIG. 9/STEP26).

The output controller 211 determines whether or not the received identification information is identification information on the mobile unit which can transport the user (FIG. 9/STEP28). The output controller 211 may determine the mobile unit which can transport the user on the basis of the regularity of the identification information. The output controller 211 may determine whether or not the mobile unit can transport the user, on the basis of the information preliminarily stored in the client storing unit 22. The output controller 211 may determine whether or not the mobile unit can transport the user, by querying the outside of the server 1 through the client communication unit 23.

When the determination result is affirmative (FIG. 9/STEP28: YES), the output controller 211 stores "Vehicle" in the variable MODE (FIG. 9/STEP30).

When the determination result is negative (FIG. 9/STEP28: NO), the output controller 211 stores "Non-Vehicle" in the variable MODE (FIG. 9/STEP32).

When the determination result is negative (FIG. 9/STEP24: NO), the output controller 211 stores "Unconnected" in the variable MODE (FIG. 9/STEP34).

After the processes of FIG. 9/STEP30, STEP32 or STEP34, the output controller 211 finishes the mobile unit connection process.

(Process in Connection)

Next, referring to FIGS. 10 to 15, the process in connection in FIG. 2/STEP12 is described.

Figure 10:
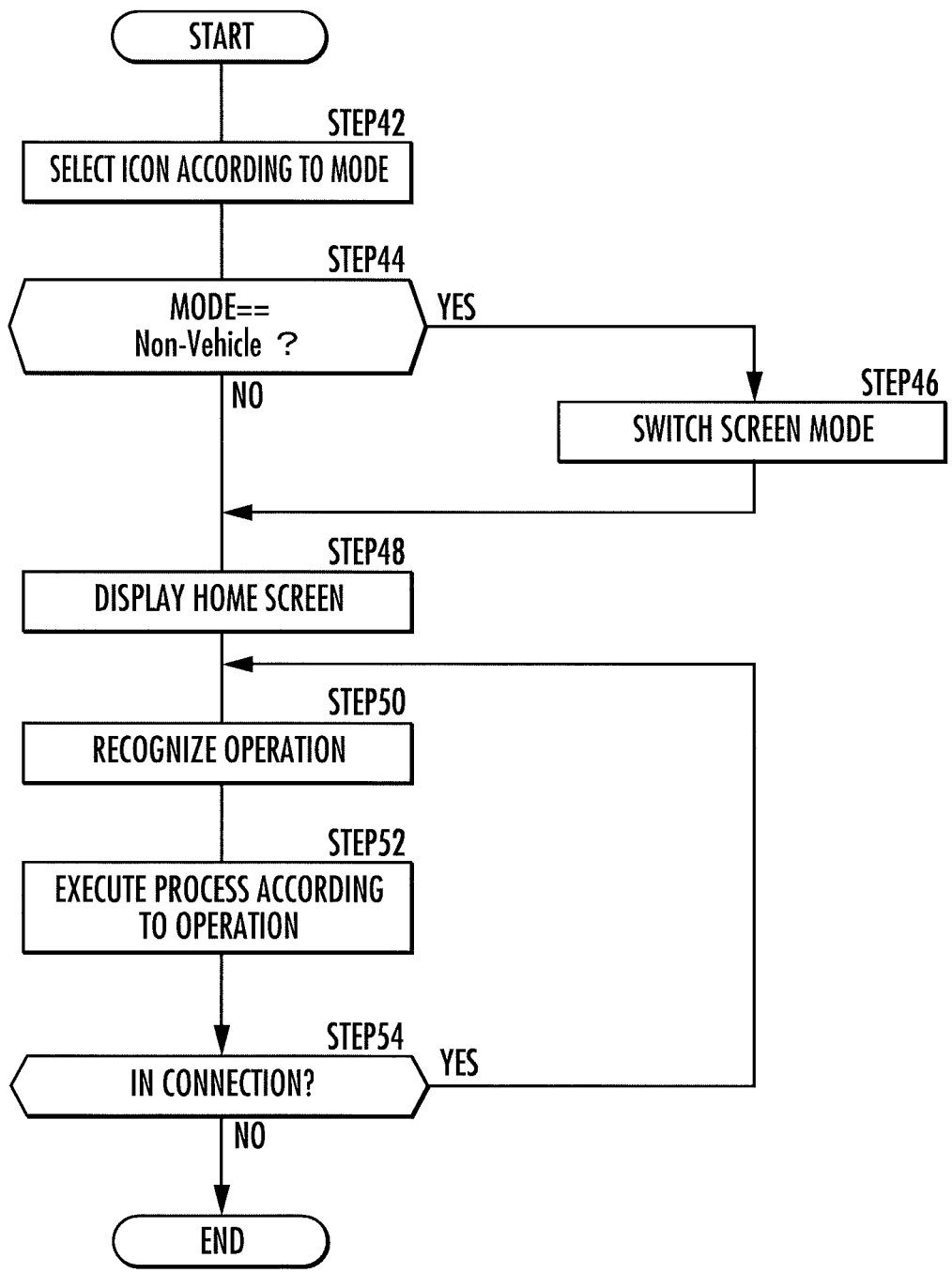
FIG. 10 is a flowchart of a process in connection.

The output controller 211 selects an icon according to the variable MODE (FIG. 10/STEP42). The icon corresponds to an example of "mobile unit identification image information" of the present invention. The output controller 211 may output, on the image display unit 251, an image indicating that one of multiple icons as "mobile unit identification image information", instead of or in addition to the example.

Figure 11:
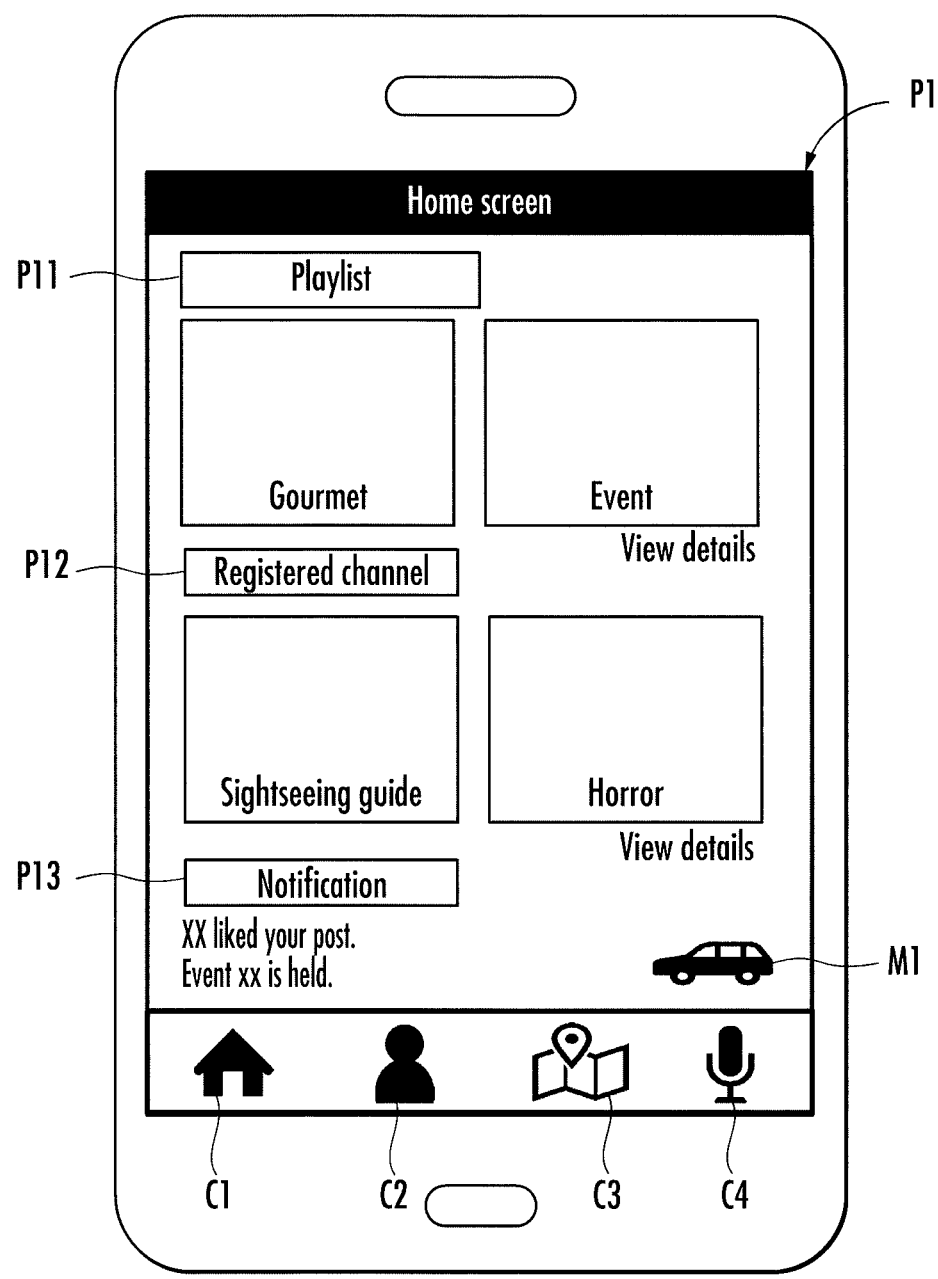
FIG. 11 is a diagram showing a configuration of a home screen in a content reproduction mode.

For example, when the value of the variable MODE is "Vehicle", the output controller 211 selects a vehicle icon M1 shown in FIG. 11. When the value of the variable MODE is "Non-Vehicle", the output controller 211 selects a robot icon M2 shown in FIGS. 12 to 15.

The output controller 211 determines whether or not the value of the variable MODE is "Non-Vehicle" (FIG. 10/STEP44).

When the determination result is affirmative (FIG. 10/STEP44: YES), the output controller 211 switches the screen mode to an operation control mode (FIG. 10/STEP46). The normal screen mode (screen mode in FIG. 2/STEP02 to FIG. 2/STEP10) is a content reproduction mode.

In a case where the determination result in FIG. 10/STEP44 is negative (FIG. 10/STEP44: NO) or after the process in FIG. 10/STEP46, the output controller 211 displays the home screen on the image display unit 251 according to the screen mode (FIG. 10/STEP48). The screen according to the image mode, such as the home screen according to the image mode, corresponds to one example of "mobile unit identification image information" of the present invention.

The output controller 211 may output, to the client output unit 25, an audio according to the value of the variable MODE, such as "connected to the vehicle" or "connected to the robot", in addition to "mobile unit identification image information".

The output controller 211 may output, to the client output unit 251, a character string according to the value of the variable MODE, such as "connected to the vehicle" or "connected to the robot", as "mobile unit identification image information", instead of or in addition to the above.

For example, when the value of the variable MODE is "Vehicle", the output controller 211 displays, on the image display unit 251, the home screen P1 in the content reproduction mode while displaying the vehicle icon M2 at a lower right portion in an overlapping manner, as shown in FIG. 11. The home screen P1 in the content reproduction mode corresponds to "interface" of the present invention, and audio or a moving image reproduced through the playlist or the like contained in the home screen P1 in the content reproduction mode corresponds to "content" of the present invention.

Figure 12:
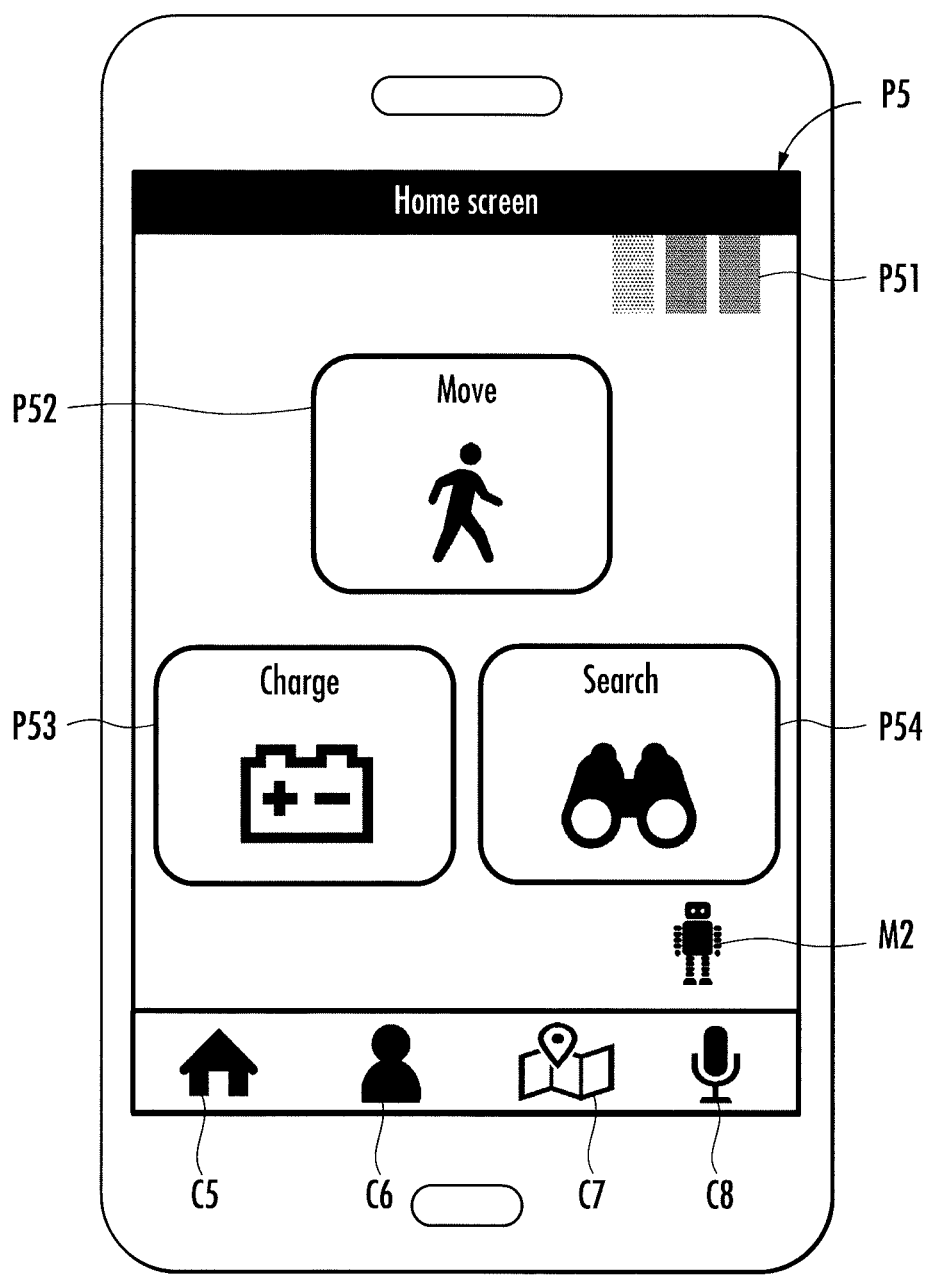
FIG. 12 is a diagram showing a configuration of a home screen in an operation control mode.

When the value of the variable MODE is "Non-Vehicle", the output controller 211 displays, on the image display unit 251, the home screen P5 in the operation control mode while displaying the robot icon M2 at the lower right portion in an overlapping manner, as shown in FIG. 12.

The home screen P5 in the operation control mode is a screen for designating a basic operation of the robot 4, and contains a battery remaining quantity display P51, a movement designation button P52, a charging designation button P53, and a search designation button P54. The home screen P5 in the operation control mode contains a home button C5, a my setting button C6, a map button C7, and a conversation button C8, at the lower positions of this screen P5.

The battery remaining quantity display P51 is a display of the battery remaining quantity of the robot 4 indicated in the output signal of the battery sensor 423 of the robot 4.

The movement designation button P52 is a button for designating the movement destination of the robot 4.

The charging designation button P53 is a button for designating charging of the robot 4 with the nearest charger.

The search designation button P54 is a button for designating search for a target object around the robot 4.

The home button C5, the my setting button C6, the map button C7, and the conversation button C8 are buttons for transition to the home screen P5 in the operation control mode (see FIG. 12), the my setting button C6 (see FIG. 13), the map screen P7 (see FIG. 14), and the conversation mode screen P8 (see FIG. 15), respectively. The home screen P5 in the operation control mode corresponds to "interface" of the present invention.

The output controller 211 recognizes the operation by the user through the client input unit (FIG. 10/STEP50). For example, the output controller 211 recognizes an operation of pressing any of the buttons P52 to P54 and C5 to C8.

The output controller 211 executes a process according to the recognized operation (FIG. 10/STEP52).

For example, when the recognized operation is an operation of pressing the movement designation button P52, the output controller 211 displays a screen for selecting the movement destination position, on the image display unit 251.

Figure 13:
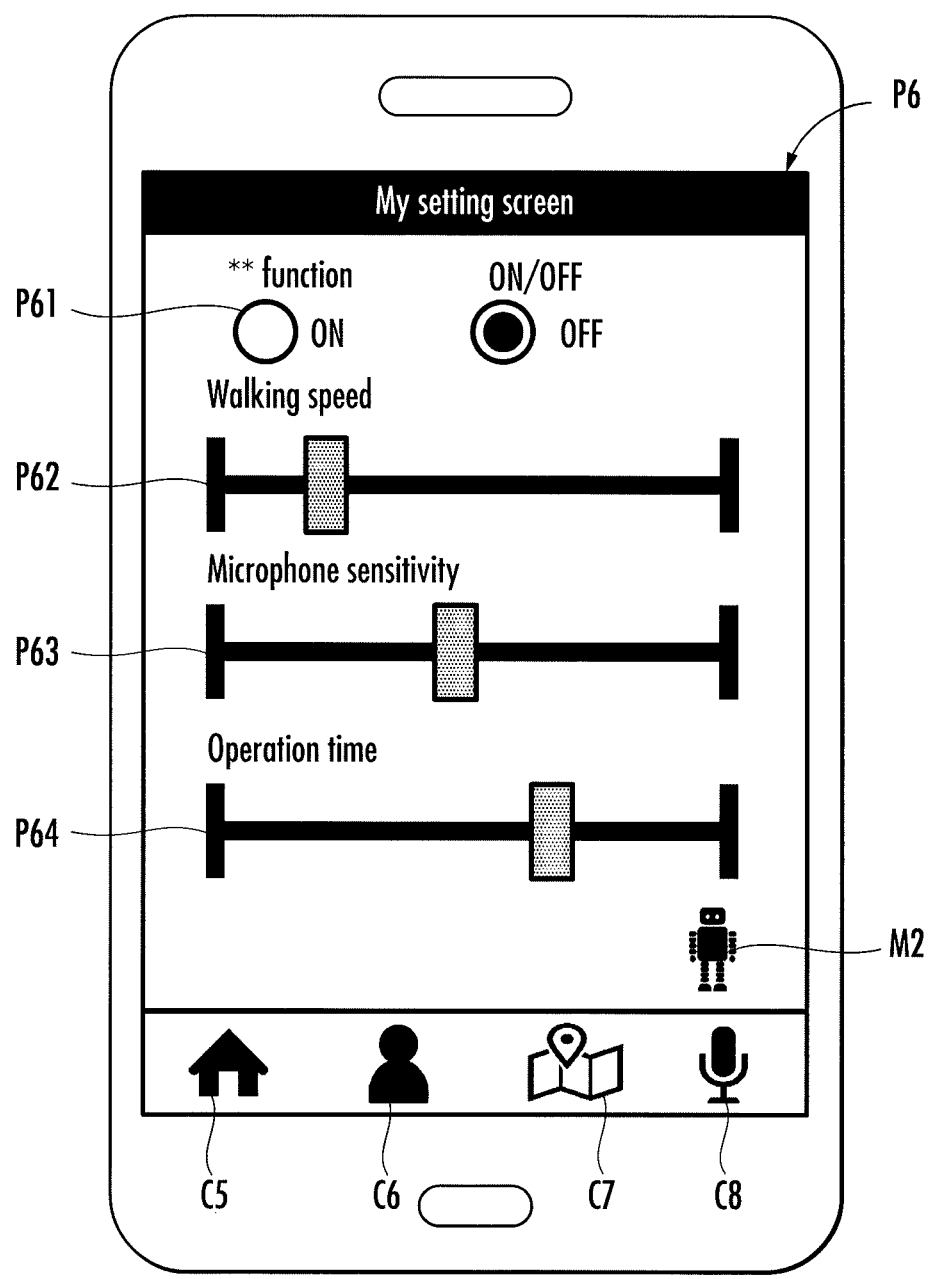
FIG. 13 is a diagram showing a configuration of a my setting screen.

When the recognized operation is an operation of pressing the map setting button C6, the output controller 211 displays, on the image display unit 251, the map setting screen P6 shown in FIG. 13 while displaying the robot icon M2 at the lower right portion in an overlapping manner.

Here, each of the screens which are the my setting screen P6 (see FIG. 13), the map screen P7 (see FIG. 14) and the conversation mode screen P8 (see FIG. 15) are supplementarily described.

As shown in FIG. 13, the my setting screen P6 is a screen for basic setting during the robot 4 being in operation, and contains a function turning ON and OFF button P61, a walking speed setting bar P62, a microphone sensitivity setting bar P63, and a robot operation time setting bar P64. The my setting screen P6 contains a home button C5, a my setting button C6, a map button C7, and a conversation button C8, at the lower positions of this screen P6.

The function turning ON and OFF button P61 is a button for turning on and off a predetermined function, and is, for example, a button which switches ON and OFF of an automatic conversation function of the robot 4.

The walking speed setting bar P62 is a bar through which the walking speed of the walking robot 4 is set.

The microphone sensitivity setting bar P63 is a bar through which the sensitivity of the microphone of the robot 4 is set.

The robot operation time setting bar P64 is a bar for setting the maximum operation time period of the robot 4.

Figure 14:
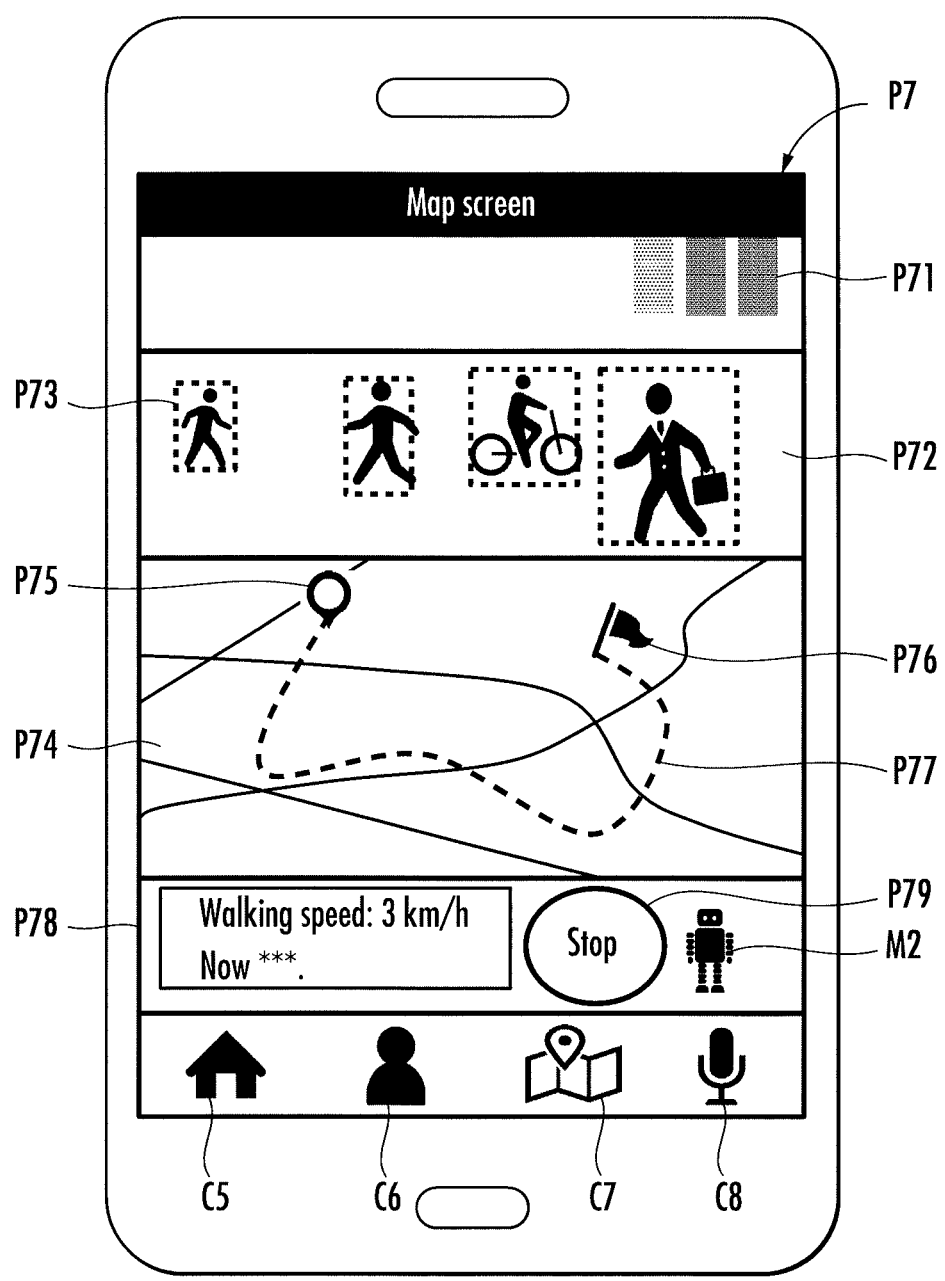
FIG. 14 is a diagram showing a configuration of a map screen in the operation control mode.

As shown in FIG. 14, the map screen P7 contains a battery remaining quantity display P71, an ambient environment display P72, a map P74, a robot operation state display P78, and a stop button P79. The map screen P7 contains a home button C5, a my setting button C6, a map button C7, and a conversation button C8, at the lower positions of this screen P7.

As with the battery remaining quantity display P51, the battery remaining quantity display P71 is a display of the battery remaining quantity of the robot 4 indicated in the output signal of the battery sensor 423 of the robot 4.

The ambient environment display P72 is a display of the ambient environment of the robot 4 indicated in the signal output from the ambient environment sensor 421, and is an image of the front of the robot taken by a camera, in this embodiment. This image (ambient environment display P72) contains an object display P73 indicating an object which resides around the robot 4 and has been recognized by image analysis.

The map P74 is a map of the current position of the robot 4 and therearound. The map P74 contains a current position display P75, a destination position display P76, and a route P77.

The current position display P75 is a display of the current position of the robot 4 indicated in the output signal of the position sensor 422.

The destination position display P76 is a display of the movement destination position designated by the movement designation button P52 (FIG. 12).

The route P77 is a route which connects the current position of the robot 4 to the movement destination position.

The robot operation state display P78 is a display of the operation state of the robot 4, such as the movement speed of the robot 4 and what the robot is currently performing (e.g., object transportation).

The stop button P79 is a button for stopping the robot 4.

Figure 15:
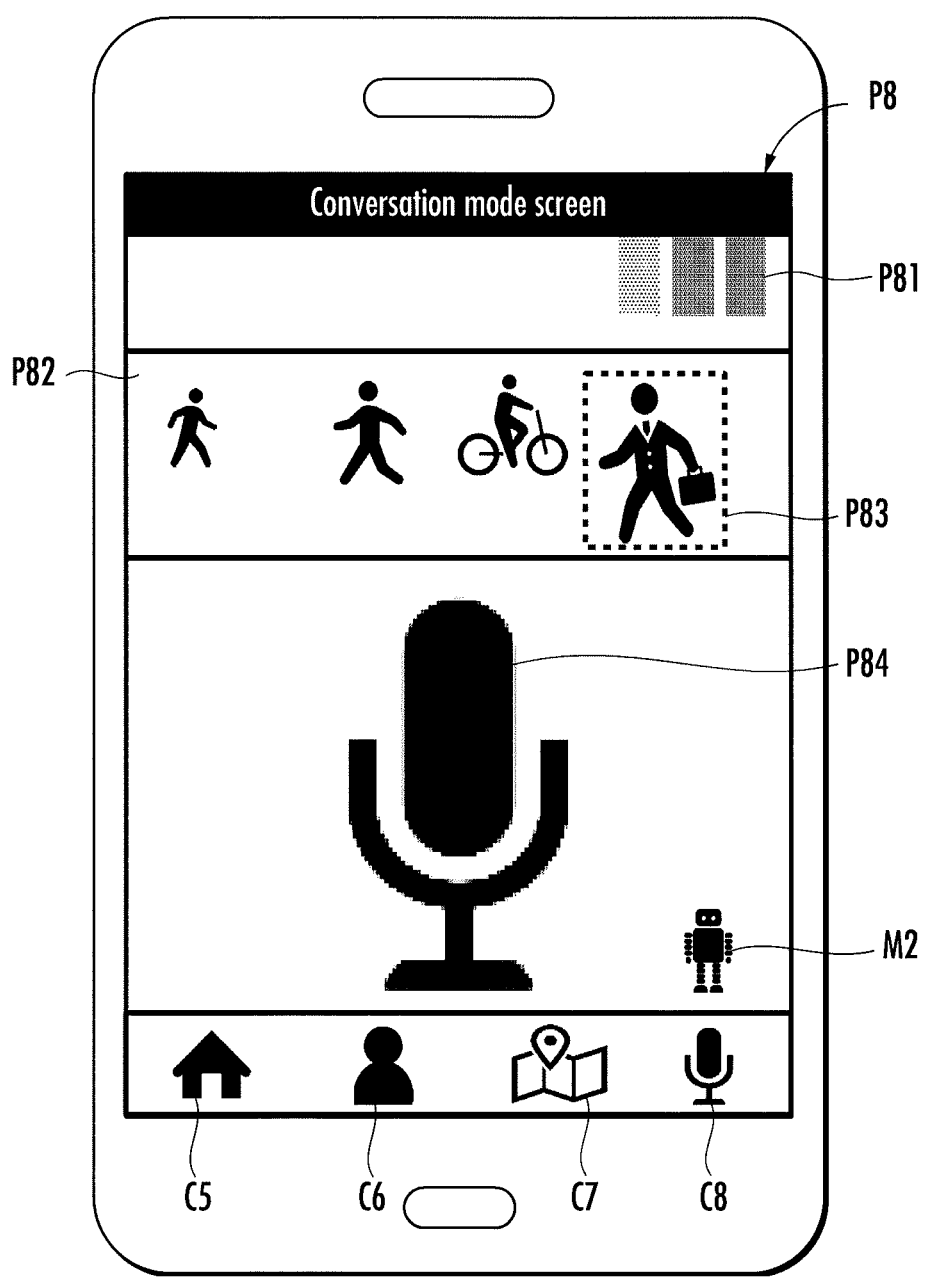
FIG. 15 is a diagram showing a configuration of a conversation mode screen.

As shown in FIG. 15, the conversation mode screen P8 contains a battery remaining quantity display P81, an ambient environment display P82, and a recording display P84. The conversation mode screen P8 contains a home button C5, a my setting button C6, a map button C7, and a conversation button C8, at the lower positions of this screen P8.

As with the battery remaining quantity display P51, the battery remaining quantity display P81 is a display of the battery remaining quantity of the robot 4 indicated in the output signal of the battery sensor 423 of the robot 4.

As with the ambient environment display P72, the ambient environment display P82 is a display of the ambient environment of the robot 4 indicated in the signal output by the ambient environment sensor 421. The ambient environment display P82 contains a display P83 of a person in speech through the robot 4.

The recording display P84 is an icon indicating that recording is currently in progress for conversation.

After FIG. 9/STEP52, the output controller 211 determines whether or not the client 2 is in connection with the mobile unit (FIG. 9/STEP54).

When the determination result is affirmative (FIG. 9/STEP54: YES), the output controller 211 executes the processes in and after FIG. 9/STEP50.

When the determination result is negative (FIG. 9/STEP54: NO), the output controller 211 finishes the process in connection.

REFERENCE SIGNS LIST

2 . . . Client, 3 . . . Vehicle (mobile unit), 4 . . . Robot (mobile unit), 23 . . . Client communication unit, 25 . . . Client output unit, 211 . . . Output controller, P1 . . . Home screen, P2 . . . My page screen, P3 . . . Map screen, P4 . . . Recording screen, P5 . . . Home screen in operation control mode, P6 . . . My setting screen, P7 . . . Map screen in operation control mode, P8 . . . Conversation mode screen.

What is claimed is:

1. A client connectable to a server via a wide-area network and a plurality of types of mobile units via a local network, the plurality of types of mobile units comprising at least one type of vehicles and robots, the client comprising:
   at least one processor; and
   at least one memory including computer program code,
   wherein the at least one memory and the computer program code are configured to, with the at least one processor, cause the client to
   display an image on an image display unit,
   perform communication via the wide-area network with the server to execute a predetermined program,
   perform communication with one mobile unit via the local network during running the predetermined program,
   identify one type of the one mobile unit among the plurality of types of mobile units, based on the communication with the one mobile unit,
   output on the image display unit, both vehicle-identification image information and a home screen to the predetermined program in an overlapping manner when the identified type is the type of the vehicle, and
   output on the image display unit, both robot-identification image information and a home screen to the robot in the overlapping manner when the identified type is the type of the robot.

2. The client according to claim 1, wherein the mobile unit identification image information contains an icon indicating the mobile unit concerned.

3. The client according to claim 1, wherein the at least one memory and the computer program code are further configured to, with the at least one processor, cause the client to output the mobile unit identification image information at a position of the image display unit common to the plurality of mobile units.

4. The client according to claim 1, wherein the mobile unit identification image information is mobile unit identification image information corresponding to a type of the mobile unit concerned.

5. The client according to claim 1, wherein even when a plurality of screens are switched, the at least one memory and the computer program code are further configured to, with the at least one processor, cause the client to output both the switched screen and the mobile unit identification image information in a viewable manner.

6. The client according to claim 1, wherein the at least one memory and the computer program code are further configured to, with the at least one processor, cause the client to display a screen corresponding to the mobile unit concerned, as the mobile unit identification image information, on the image display unit.

7. The client according to claim 1, wherein the at least one memory and the computer program code are further configured to, with the at least one processor, cause the client to display, on the image display unit, a screen displaying a position of the mobile unit, as the mobile unit identification image information.

8. The client according to claim 1, wherein the at least one memory and the computer program code are further configured to, with the at least one processor, cause the client to output content associated with a type of the mobile unit concerned, an interface for using a function of the client associated with the type of the mobile unit concerned, or an interface for using a function of the mobile unit, as the mobile unit identification image information, to the image display unit.

9. The client according to claim 8, wherein when the mobile unit concerned is a mobile unit capable of transporting a user of the client along with movement of the mobile unit, the at least one memory and the computer program code are further configured to, with the at least one processor, cause the client to output an interface of outputting an audio, a still image or a moving image, as the interface, to the image display unit.

10. The client according to claim 1, wherein the at least one memory and the computer program code are further configured to, with the at least one processor, cause the client to detect an operation of a user of the client, and
   output to the image display unit at least one screen among a plurality of screens according to the operation of the user detected by the client.

11. A computer program embodied on a non-transitory computer readable medium, the computer program, when executed by a processor, causes a client through the processor to:
   cause the client to connect to a server via a wide-area network and a plurality of types of mobile units via a local network, the plurality of types of mobile units comprising at least one type of vehicles and robots;
   display an image on an image display unit;
   perform communication via the wide-area network with the server to execute a predetermined program;
   perform communication with one mobile unit via the local network during running the predetermined program;
   identify one type of the one mobile unit among the plurality of types of mobile units, based on the communication with the one mobile unit;
   output on the image display unit, both vehicle-identification image information and a home screen to the predetermined program in an overlapping manner when the identified type is the type of the vehicle; and
   output on the image display unit, both robot-identification image information and a home screen to the robot in the overlapping manner when the identified type is the type of the robot.

* * * * *